E. NORTON.
Can Soldering Apparatus.

No. 232,409. Patented Sept. 21, 1880.

Witnesses:
Julius Dawson
L. M. Norton

Inventor
Edwin Norton

UNITED STATES PATENT OFFICE.

EDWIN NORTON, OF CHICAGO, ILLINOIS.

CAN-SOLDERING APPARATUS.

SPECIFICATION forming part of Letters Patent No. 232,409, dated September 21, 1880.

Application filed February 27, 1880.

*To all whom it may concern:*

Be it known that I, EDWIN NORTON, residing at Chicago, in the county of Cook and State of Illinois, and a citizen of the United States, have invented new and useful Improvements in Can-Soldering Apparatus, of which the following is a full description, reference being had to the accompanying drawings, in which—

Figure 1:
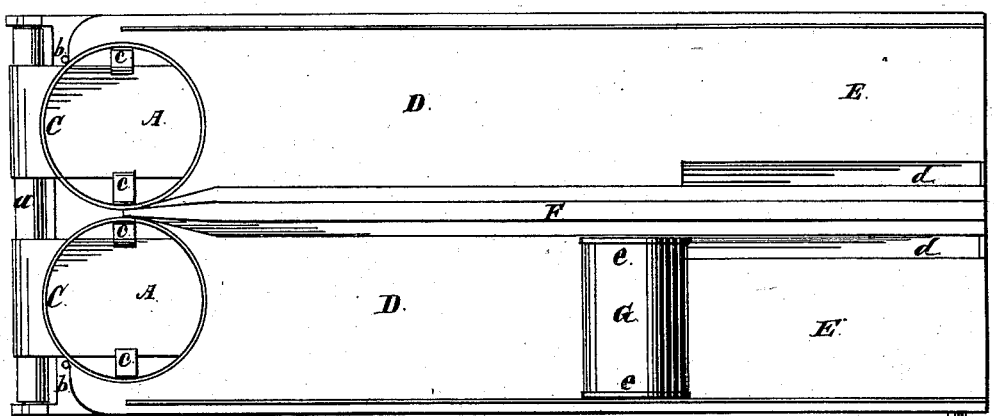
Figure 2:
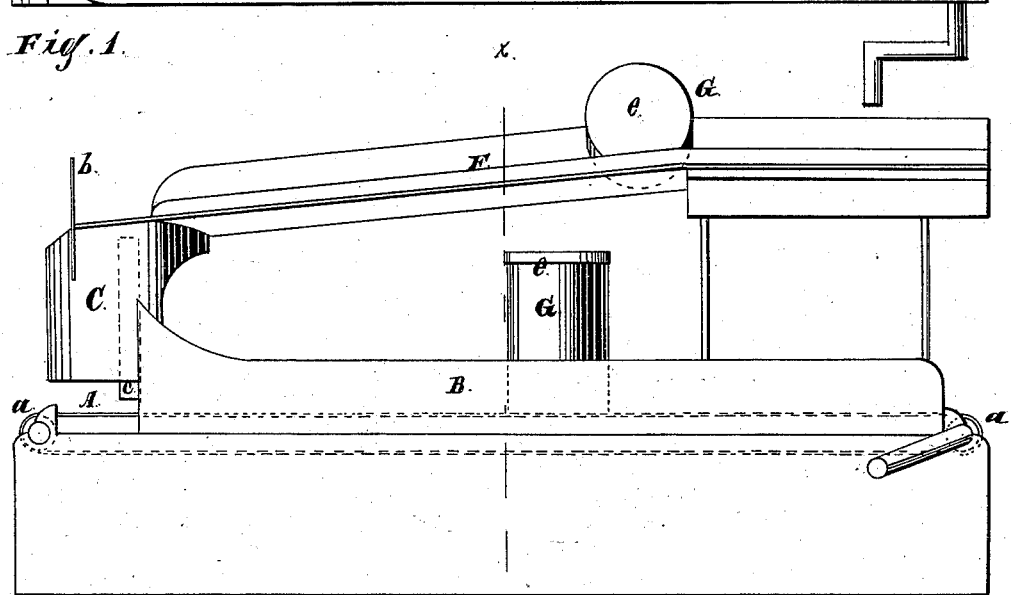
Figure 3:
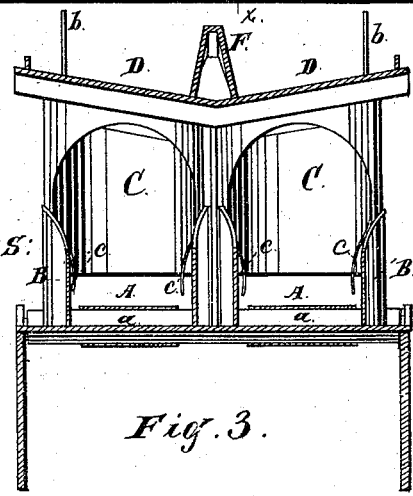

Figure 1 is a top or plan view; Fig. 2, a side elevation; Fig. 3, a cross-section on line $x\,x$ of Fig. 1.

In the manufacture of sheet-metal cans to be used for various purposes, it is the practice to unite the heads to the body of the can by passing the portion to be seamed through a bath of molten solder in such manner that the solder has access to the seam without heating the other parts so as to injure the can.

Various special machines and devices have been used for this purpose—among others an apparatus consisting of inwardly-inclined tables or supports, on which the body of the can rests in such manner as that the end to be seamed will pass through a slot at the inner side of the table or support, and enter a bath of soldering material located beneath such slot a sufficient distance for uniting the parts while the edge of the can passes through the bath, the can being rolled along the table or support by suitable devices, so as to insure the dipping of the seam in the soldering material and cause every portion thereof to be subjected to the action of the solder.

The object of this invention is the removal of the cans after being subjected to the action of the soldering-bath without any jar or concussion that will destroy or injure the seam, and in an automatic manner, and so that when ready for final removal from the apparatus they will be sufficiently cool, so as not to be injured by handling or moving; and its nature consists in providing an extension of the soldering tables or platforms, and locating beneath such extension and the soldering devices an endless belt or carrier, on which the cans are delivered and by which they are transported for cooling purposes; in providing a discharge opening or tube located at the end of the table or platform extension, through which the cans are deposited on the endless belt or carrier; in providing a stop so arranged as that the can will strike and be turned thereby, so as to descend endwise on the endless belt or carrier; and in providing retaining-springs, to prevent a too rapid descent of the can onto the endless belt or carrier.

In the drawings, A represents the endless belts or carriers, one for each table or platform, made of canvas or other suitable material, and mounted on suitable rollers, $a$, at each end, one of which may be provided with a crank or other device for moving the belt or carrier. These endless belts or carriers are located and travel beneath the soldering tables or platforms and their extensions, and extend the entire length thereof.

B are side rails or guards on each side of the belts or carriers A, and extending above A a sufficient distance to keep the cans in place.

C are discharge openings or tubes located at the end of the table-extensions, through which the cans are deposited on the endless carriers or belts. These openings or tubes C are of a sufficient diameter to permit of the passage of the cans without catching or binding.

D are the table or platform extensions, having an inclination downward toward their outer ends and the same inclination inward or to the center, where they come together as the soldering tables or platforms. These extensions D are of the same width as the soldering tables or platforms, and of a length sufficient to allow the solder to cool somewhat while the can is descending thereon before entering the discharge opening or tube C. The discharge opening or tube has a stop, $b$, so located that the can will strike and be turned thereby, so as to descend endwise into the discharge opening or tube, and be deposited on its end on the endless belt or carrier; and in order to prevent a too rapid descent of the can, springs $c$, located around the interior of the tube or opening C, and arranged to press against the sides of the can, may be used.

E are the soldering-tables, of a sufficient length to insure the soldering of the head to the body of the can while passing over the table, and having the required inclination to cause the end being soldered to pass through the soldering-slot *d* and enter the soldering material, so that the seam between the head *e* and the body of the can will be subjected to the action of the solder and be effectually and tightly closed.

F is the central stop or guide, against which the head *e* of the can rests, so as to insure the moving of the can properly and the entrance of head into the bath the required distance.

G are cans of any of the ordinary forms of construction of round cans.

A chain or other suitable device is to be provided for moving the cans over the soldering tables or platforms.

A frame or support of suitable construction is to be provided for supporting the apparatus.

In the form of apparatus shown the soldering-tables, extensions, discharge tubes or openings and appliances, and endless belts or carriers are double or in pairs; but single ones may be used, if desired.

In use the cans are soldered while passing over the soldering tables or platforms in the usual manner, and on leaving such tables or platforms pass onto and down the extensions or platforms D, and, striking the stop *b*, are turned endwise into the opening or tube C, through which they pass on the endless belt or carrier A, by which they are carried along beneath the tables or platforms to that end at which they were first deposited on the soldering tables or platforms. During this transit on the endless belt or carrier the solder will become so cool that handling or moving will not affect the seam, and the head and body of the can will be firmly and securely united, and a perfect seam formed.

The platforms or extensions D should have sufficient inclination downward to insure a descent of the can that will cause it to be turned by striking the stop *b*.

What I claim as new, and desire to secure by Letters Patent, is—

1. In a soldering apparatus, the inclined extension or platform D and opening or tube C, in combination with the endless belt or carrier A, substantially as and for the purposes specified.

2. In a soldering apparatus, the inclined extension or platform D and tube or opening C and a stop, *b*, in combination with an endless belt or carrier, A, substantially as and for the purposes specified.

3. The inclined extension or platform D, tube or opening C, with stop *b* and springs *c*, and endless belt or carrier A, in combination with a soldering apparatus, substantially as and for the purposes specified.

EDWIN NORTON.

Witnesses:
JULIUS DAVISON,
L. M. NORTON.